US009698627B2

(12) United States Patent
Kim (10) Patent No.: US 9,698,627 B2
(45) Date of Patent: Jul. 4, 2017

(54) DEVICE FOR OPTIMIZING ELECTRICAL ENERGY

(71) Applicant: KESECO CO., LTD., Seoul (KR)

(72) Inventor: Eun Guk Kim, Seoul (KR)

(73) Assignee: KESECO CO., LTD., Seoul (KR)

( * ) Notice: Subject to any disclaimer, the term of this patent is extended or adjusted under 35 U.S.C. 154(b) by 504 days.

(21) Appl. No.: 14/372,780

(22) PCT Filed: Nov. 14, 2012

(86) PCT No.: PCT/KR2012/009607
§ 371 (c)(1),
(2) Date: Jul. 17, 2014

(87) PCT Pub. No.: WO2013/115468
PCT Pub. Date: Aug. 8, 2013

(65) Prior Publication Data
US 2015/0305180 A1    Oct. 22, 2015

(30) Foreign Application Priority Data
Jan. 30, 2012    (KR) .......................... 10-2012-0008889

(51) Int. Cl.
*H02J 15/00*    (2006.01)
*H02S 99/00*    (2014.01)
*B01J 21/00*    (2006.01)

(52) U.S. Cl.
CPC .............. *H02J 15/00* (2013.01); *H02S 99/00* (2013.01)

(58) Field of Classification Search
CPC ............ B01J 21/00; H02J 15/00; H02S 99/00
USPC ......................................................... 307/18
See application file for complete search history.

(56) References Cited

U.S. PATENT DOCUMENTS

2010/0134949 A1* 6/2010 Choi .................... H02N 11/002
361/301.2

FOREIGN PATENT DOCUMENTS

| JP | 2000184567 A | 6/2000 |
|---|---|---|
| KR | 1020020028862 A | 4/2002 |
| KR | 100419312 | 2/2004 |
| KR | 100994817 B1 | 11/2010 |

OTHER PUBLICATIONS

International Search Report for application No. PCT/KR2012/009607, dated Dec. 26, 2012, citing the above reference(s).

* cited by examiner

*Primary Examiner* — Robert Deberadinis
(74) *Attorney, Agent, or Firm* — Hauptman Ham, LLP (57) ABSTRACT

The invention includes; a sealed housing made of a plastic or metal material; a conductive plate made of a copper material, positioned in the center of the housing, and respectively connected to power lines so as to accumulate magnetic energy generated in an internal polymer-clay nanocomposite; a base insulation plate having insulation characteristics so as to fix the conductive plate; electric wires which are power lines for transmitting the magnetic energy stored on the conductive plate to the outside; the polymer-clay nano composite filled in the bottom portion of the housing such that the conductive plate is submerged therein; an upper ceramic layer coated on the inner wall of the housing so as to promote the magnetic interaction of a ceramic compound in the upper space portion of the polymer-clay nano composite.

12 Claims, 10 Drawing Sheets

DEVICE FOR OPTIMIZING ELECTRICAL ENERGY

FIELD OF THE INVENTION

This invention comprises an electrical energy optimizing device.

DESCRIPTION OF THE RELATED ART

In general, electrical energy transmission efficiency drop, i.e., energy loss occurring in homes and commercial/industrial facilities is closely related to the operating characteristics of their loads. In particular, the energy loss caused by the operating characteristic of an inductive load occupies the largest part of it.

As a solution to this, various techniques such as VFDs, Soft Starters, or high-efficiency motors have been introduced. However, not to mention the high cost, these are only applicable to low-capacity motors because they have low output range of 100 kW or less. In addition, such techniques still have problems such as difficult serial installation and space constraint due to the large volume of the devices.

On top of this, additional loss may be caused by various types of noise and fluctuation produced in the power transmission environment from the power plant, to the transmission substation, to the distribution substation, and to the electrical consumers, and caused by the specific resistance of the electrical line via which electric current flows during the electric supply process.

Among theses, various devices for addressing the noise and fluctuation problems during transmission have already been or are being introduced in many industrial facilities, as the technologies such as harmonic filters, UPSs or power factor correction are becoming more common.

In addition, for the matter with the specific resistance of the electrical line, the materials for all the supplying routes should be replaced by ones with the higher conductivity, which is very costly and involves many issues of effectiveness. Even if this approach is realized, the energy loss can be reduced by at most 2%. Accordingly, doubt remains over effectiveness of this approach.

A far-infrared ray is a kind of an infrared spectrum of electromagnetic radiation, comprising the wavelengths up to 2.5-1000 μm. However, the usual range of the wavelengths used in industries is 2.5-30 μm. Such far-infrared rays have physical properties of resonance absorption, radiation, and penetrating force. In addition, the molecules composing the substance show a unique deformation vibration, rotational vibration, and stretching vibration according to the array of the atoms. The vibration frequency that shows these molecular vibration wavelengths is determined by molecular structure to a specific value, typically ranging from 2.5 to 30 μm. At this, when radiation energy is irradiated, if the vibration frequency of the radiating far-infrared rays and that of the molecules are identical, the molecules absorb far infrared radiation energy so that the vibration becomes more intense, which is called resonance absorption effect. Due to this operation, a part of kinetic energy is converted into activation energy, which activates the molecular motion.

Molecules are activated in a manner that when the far-infrared rays in a predetermined range of wavelengths are supplied to an electric line where currents are flowing, the molecules composing the conductor of the line cause resonance absorption vibration to absorb it. That is, as disclosed in Korean Patent No. 10-0419312, the conductor composing the electric line is designed to include a space to supply rotating electromagnetic waves (π-RAY) (Gibbs free energy), a kind of thermodynamic activation energy; a housing on the inner wall of which the ceramic layer is coated that generates rotating electromagnetic waves inside the space; an inner cover plate housing fixed at a predetermined height in the inner space and allows resonance absorption effect by repeatedly absorbing and emitting rotating electromagnetic waves generated from the ceramic layer; a conductive plate which is a conductor placed at the space under the inner cover plate so as to collect the rotating electromagnetic waves generated from the ceramic layer; and an electric line that connects the conductor so as to discharge the rotating electromagnetic waves collected by the conductive plate.

Such a device disclosed in the above patent document corresponds to the power-saving device (100) shown in FIGS. 1 to 4. The power-saving device (100) is configured so that a ceramic layer (11) (preferably with the thickness of 1 mm) generating the rotating electromagnetic waves is formed with materials including sericite on the inner wall of a metal or plastic housing (10) in which guiding wave to the outside is blocked; an inner cover plate (20) is placed supported by a spacer rod (12) with a predetermined height inside the inner space; a conductive plate (30) penetrated by the induced rotating electromagnetic waves is placed on a base insulation plate (31) in the free air space between the inner cover plate (20) and the bottom surface; and the conductive plate (30) is connected to power connecting electric wires (33).

Figure 1:
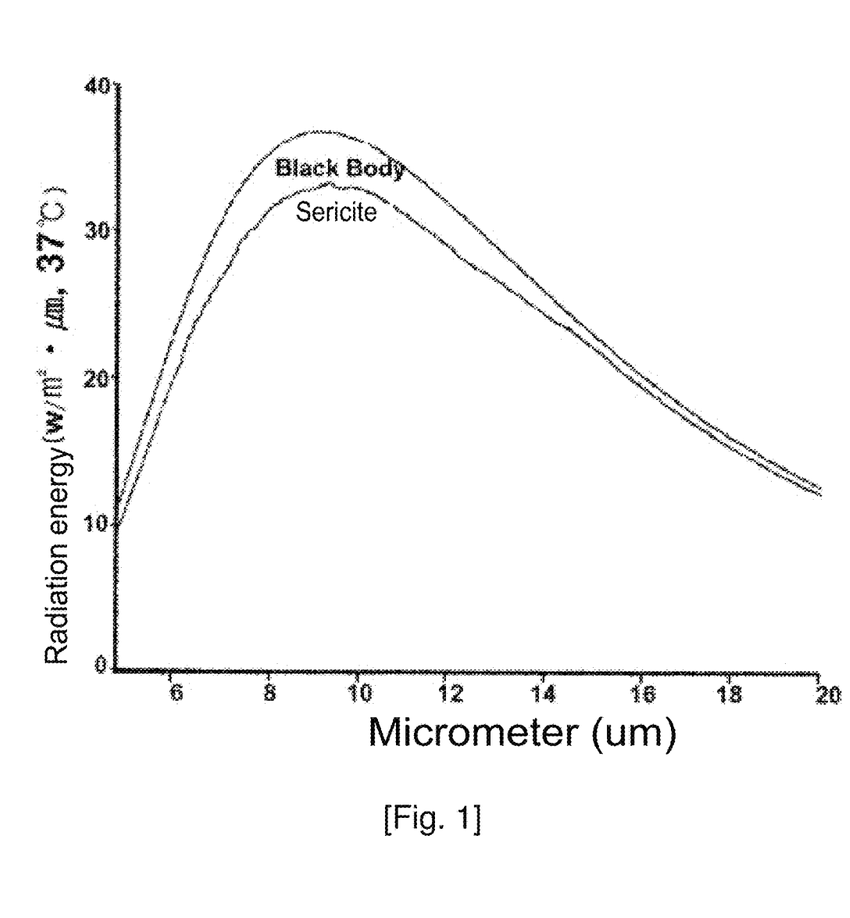
FIG. 1 is a graph showing energy waveforms by wavelength generated from ordinary ceramic layers.
Figure 2:
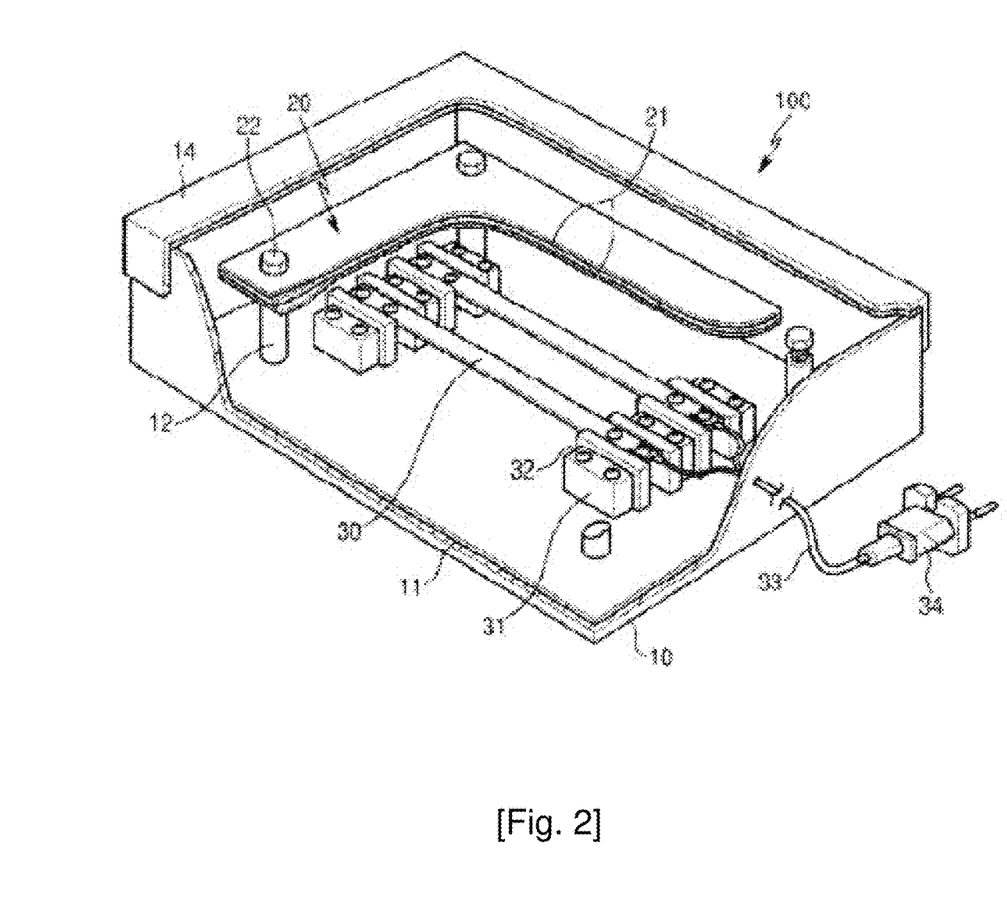
FIG. 2 is a perspective cut-away view of a main part of the device of the prior art.
Figure 3:
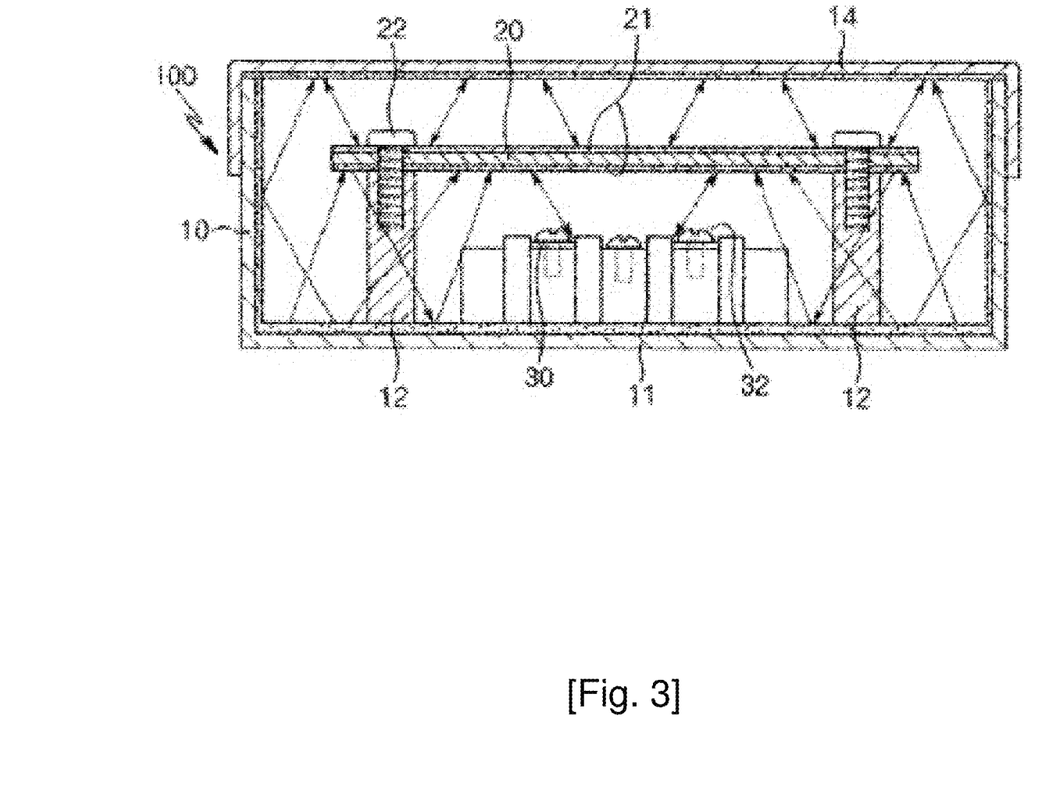
FIG. 3 is a cross-sectional view of FIG. 2.

The inner cover plate (20) has a size so that certain space is maintained between the inner wall of the housing (10), while the inner cover plate (20) adjusts the height of base insulation plate (31) so as to be at the intermediate position from the bottom surface of the housing (10). The reference numeral 21 refers to a covering ceramic layer; the reference numeral 22 refers to a screw that fixes the inner cover plate (20) to the spacer rod (12); the reference numeral 32 refers to a screw that allows the conductive plate (30) to be screw-fixed to the base insulation plate (31); the reference numeral 34 refers to a plug that connects a power source power line with a socket; and the reference numeral 14 refers to the cover of the housing (10).

As shown in FIG. 2, before or after assembling the power-saving device (100), the ceramic layer (11) is heated (preferably in a range of 100-150° C.; since at the temperature over 150° C. the housing (10) might be deformed, while at the temperature below 100° C. the ceramic layer activation is slow such that forming the desired rotating electromagnetic waves is difficult) before shipped to the market (it is desirable to flash-heat within the range where the housing is not deformed.) Then covalent bond and crystallization pi bond of the ceramic layer (11) itself are activated due to the heat, generating the rotating electromagnetic waves. The waves are generated at the inside in countless wavelength forms as in FIG. 3, causing resonance absorption effect via the inner cover plate (20). The covering ceramic layer (21) is formed on the upper and lower surfaces of the inner cover plate (20) configuring a metal plate so that more rotating electromagnetic waves are generated at the boundary layer between metal plate crystalline coherence and ceramic covalence bond, therefore radically increasing the rotating electromagnetic wave generation. That is, continual conversion is caused that the rotating electromagnetic waves emitted from the coated surface of the ceramic layer (11) repeat reflecting and absorbing at the free air space with the covering ceramic layer (21) of the inner cover plate (20), changing into rotating electromagnetic waves. Here, the inner cover plate (20) is formed as having a size that allows to maintain certain space between the inner wall of the housing (10), therefore performs so that kinetic energy is continuously generated to allow rotating electromagnetic waves to absorb and repeat along the upper and lower surface of the inner cover plate (20). In addition, the base insulation plate (31) serves to locate the conductive plate (30) at the intermediate position between the bottom surface and the cover plate (20), therefore maximizing the amount of rotating electromagnetic waves induced and absorbed to the conductive plate (30).

Figure 4:
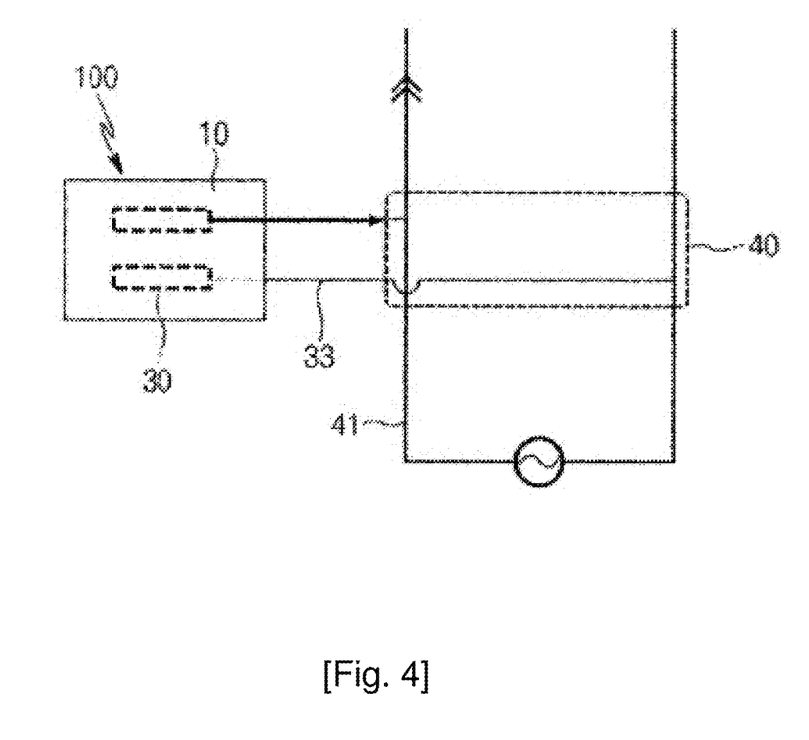
FIG. 4 is a diagram showing a way how the device of the prior art is applied.

The rotating electromagnetic waves are activated the most at the free air space between the inner cover plate (20) and the bottom surface, and therefore are induced to the conductive plate (30) at the free air space. The conductive plate (30) is connected to a power terminal of the ordinary socket (40) that supplies power as in FIG. 4. The power line (41) connected to the power terminal has its own flow of rotating electromagnetic waves. However, these waves are weaker than the rotating electromagnetic waves generated inside the housing (10) of the power-saving device (100). Accordingly, if the plug (34) connected via the conductive plate (30) and electric wires (33) of the housing (10) as in FIG. 4 is connected to the socket (40), the rotating electromagnetic waves induced inside the housing (10) can be absorbed into the power line (41).

However, in this structure, the resonance of the ceramic layer generates energy by the rotating electromagnetic waves between the space portion and the inner cover plate, so a problem occurs that the housing shall be larger for a wide inner cover plate is needed. Also, the efficiency of inducing the energy to the conductive plate is inferior. In addition, due to the limitation of the technology of enlarging far-infrared rays, the structure cannot be applied to high-power systems.

Furthermore, there is another prior art regarding power-saving devices that uses capacitors. This method can perform electrification stabilization; however it is not likely to perform the function of effective power consumption reduction by electricity users. This is because the line loss generated in the ordinary power transmission and distribution process is at 1-2%, which is significantly low. Further, in terms of the power consumption process, artificial decrease of the electric consumption by suppliers leads to the lack of electrical supply as every load has rated power consumption.

Meanwhile, inductive loads, represented by motors, require electric power up to 6 times of the rated consumption at the initial starting period due to the operation principle that electrical energy shall be changed into kinetic energy. With the current state of technologies, high power consumption that exceeds the rated value at the starting period of an inductive load cannot be precisely controlled; therefore the high electric loss is also inevitably caused in this period.

DETAILED DESCRIPTION OF INVENTION

Technical Problem

The present invention is to solve these problems, aiming to provide a device for optimizing electrical energy that optimizes efficiency of electrical energy transmission by utilizing the energy delivered by far-infrared rays as means for generating magnetically-activated electromagnetic wave energy so as to supply the energy to the conductive plate.

Another object of the present invention is to provide a device for optimizing electrical energy operating by an entirely novel method of injecting magnetic wave energy by using polymer-clay nanocomposite and far-infrared ray technologies that have not been proposed in the prior art.

Yet another object of the present invention is to provide a device for optimizing electrical energy that enables solving the common problems of the existing arts including limited applicable amount, limited space for installation due to the large volume, and a difficulty in installing in series as well as optimizing the efficiency of electrical energy transmission under an inductive load.

Technical Solution

For this, the present invention comprises a sealed housing made of a plastic or metal material;

a conductive plate made of a copper material, positioned in the center of the inside of the housing, and respectively connected to power lines so as to accumulate magnetic energy generated in an internal polymer-clay nanocomposite;

a base insulation plate having insulation property so as to fix the conductive plate;

electric wires which are power lines for transmitting the magnetic energy stored on the conductive plate to the outside;

the polymer-clay nanocomposite filling the bottom portion of the housing such that the conductive plate is submerged therein;

an upper ceramic layer coated on the inner wall of the housing so as to promote the electro-magnetic interaction of a ceramic compound in the space portion above the polymer-clay nanocomposite;

an inner cover plate having upper and lower surfaces coated with inner ceramic layers which continuously radiate far-infrared rays in association with the upper ceramic layer so as to promote electro-magnetic interaction; and a spacer rod for supporting the inner cover plate in a space portion at a predetermined height.

The present invention also comprises a sealed housing made of a plastic or metal material;

a conductive plate made of a copper material, positioned in the center of the inside of the housing, and respectively connected to power lines so as to accumulate magnetic energy generated in an internal polymer-clay nanocomposite;

a base insulation plate having insulation property so as to fix the conductive plate;

electric wires which are power lines for transmitting the magnetic energy stored on the conductive plate to the outside;

the polymer-clay nanocomposite filling the bottom portion of the housing such that the conductive plate is submerged therein; and an upper ceramic layer coated on the inner wall of the housing so as to promote the electro-magnetic interaction of a ceramic compound in the space portion above the polymer-clay nanocomposite.

Polymer-clay nano matters of the polymer-clay nanocomposite before molded is formed by dispersing/hardening the main components with chemical compositions of $SiO_2$ at 60-70 wt %, $Al_2O_3$ at 15-20 wt %, $Fe_2O_3$ at 1-5 wt %, $CaO$ at 1-3 wt %, $Na_2O$ at 1-5 wt %, and $K_2O$ at 0.1-1.0 wt %, and the nano-fine particle matter added with $TiO_2$ and $BaO$ at 0.01-5 wt % as the accessory components onto polymer, curable resin. If the weight rate of the added accessory components of $TiO_2$ and $BaO$ is less than 0.01 wt %, the effect is inadequate, and if the rate exceeds 5 w %, there is no difference in the effect on specific inductive capacity, thus the method becoming uneconomical.

Adding small amount of $Y_2O_3$ at 0.01-1 wt % and $Bi_2O_3$ and CuO at 0.01-3 wt % to the nano-fine particle matter is preferable. $Y_2O_3$ performs the function of improving magnetism. If the weight rate is less than 0.01 wt %, the magnetic improvement is inadequate, and if the rate exceeds 1 wt %, there is no difference in the improvement, thus the method becoming uneconomical. $Bi_2O_3$ performs the function of improving low-temperature sinterability. If the weight rate exceeds 3 wt %, the sinterability is compromised, thus lowering the durability. CuO performs the function of improving dielectric loss. If the weight rate exceeds 3 wt %, the dielectric loss becomes higher, thus decreasing the energy saving effect.

To achieve the above-mentioned objects, a method of the present invention comprises a step of preparing electric line whose one terminal is connected to a power line; a step of preparing dried-clay nano-fine particle (nano-fine particles) by each composition; a step of preparing a lower case of the housing; a step of fastening the base insulation plate, the spacer rod and the conductive plate to the lower case with nails or bonding; a step of connecting the conductive plate and the electric line, which is an electric wire; a step of mixing dried-clay nano-fine particle according to a mixture ratio table; a step of synthesizing the mixed nano-fine particles with liquid thermosetting polymer resin and performing gelation; a step of injecting the gelated polymer-clay nanocomposite into the lower case so as to submerge the conductive plate; a step of thermal-curing the injected polymer-clay nanocomposite; a step of thermal-curing at the ordinary air pressure at the temperature in the range of 60-80° C. for 72 hours;

a step of ceramic-coating where the inner cover plate is joined to the spacer rod and the wall surfaces of the lower and upper cases and the upper and lower surfaces of the inner cover plate are ceramic-coated and be hardened; and a step of assembling the lower and upper cases.

Examples of the thermosetting polymer resin that gelates the mixed nano-fine particles may be one selected from a group consisting of epoxy, unsaturated polyester, polyethylene terephthalate, and polystyrene.

Advantageous Effects of Invention

The present invention provides a device for optimizing electrical energy that saves electrical energy by filling the bottom portion of the housing with a polymer-clay nanocomposite so that the conductive plate is submerged inside the housing of an power-saving device, in which coating ceramic layers are coated on the inner wall of the housing, energy is activated on the inner cover plate, and the activated energy is collected on the conductive plate and supplied to electric wires; employing the energy generated from the polymer-clay nanocomposite passed through far-infrared rays from the ceramic layers to generate magnetically-activated electromagnetic wave energy; and allowing the electromagnetic wave energy to supply activation energy to the conductive plate.

The present invention provides a device for optimizing electrical energy that optimizes the efficiency of transmitting AC electrical energy by equally and continuously generating magnetically-activated electromagnetic wave energy from molecules-clay nanocomposites with the self-energy passed through far-infrared rays via a space layer.

The present invention provides a device for optimizing electrical energy operating by an entirely novel method of injecting magnetic wave energy by using polymer-clay nanocomposite and far-infrared ray technologies that have not been proposed in the prior art.

The present invention provides a device for optimizing electrical energy that enables solving the common problems of the existing arts including limited applicable amount, limited space for installation due to the large volume, and difficulty in installing in series as well as optimizing the efficiency of electrical energy transmission under an inductive load.

The inventor of the present invention has found out that electromagnetic wave energy supply caused by interaction of the alternating magnetic field generated in the process of supplying AC electric power to the conductive plate submerged in the polymer-clay nanocomposite which are magnetic improves the mobility of conduction electrons flowing on the electric line and thus raises efficiency by 7-11% compared to the case with same power consumption under an inductive load, which means power consumption can be reduced by 7-11%.

The present invention can enable consumption reduction under an inductive load as well, as the electrical energy supply of which the efficiency is improved by the present invention satisfies the high power consumption need during the starting period, allowing less energy loss than in the case of ordinary electric supply.

In addition, when it comes to a resistive load, represented by a lamp, the same power consumption reduction could not be achieved as under an inductive load, for the operation principle of the resistive load which does not have specific electric consumption period is different from that of the inductive load. However, energy efficiency improvement due to the raised mobility of conduction electrons can improve intensity of illumination by about 3%.

DESCRIPTION OF THE REFERENCE NUMERALS OF THE MAIN PARTS OF THE DRAWINGS

200; Housing
215; Polymer-clay nanocomposite
220; Inner cover plate
221; Upper ceramic layer
222; Spacer rod 223; Inner ceramic layer
230; Conductive plate
231; Base insulation plate
33; Electric wires

BEST MODE FOR CARRYING OUT THE INVENTION

Embodiments of the present invention will be described in detail referring to the drawings as follows.

Figure 5:
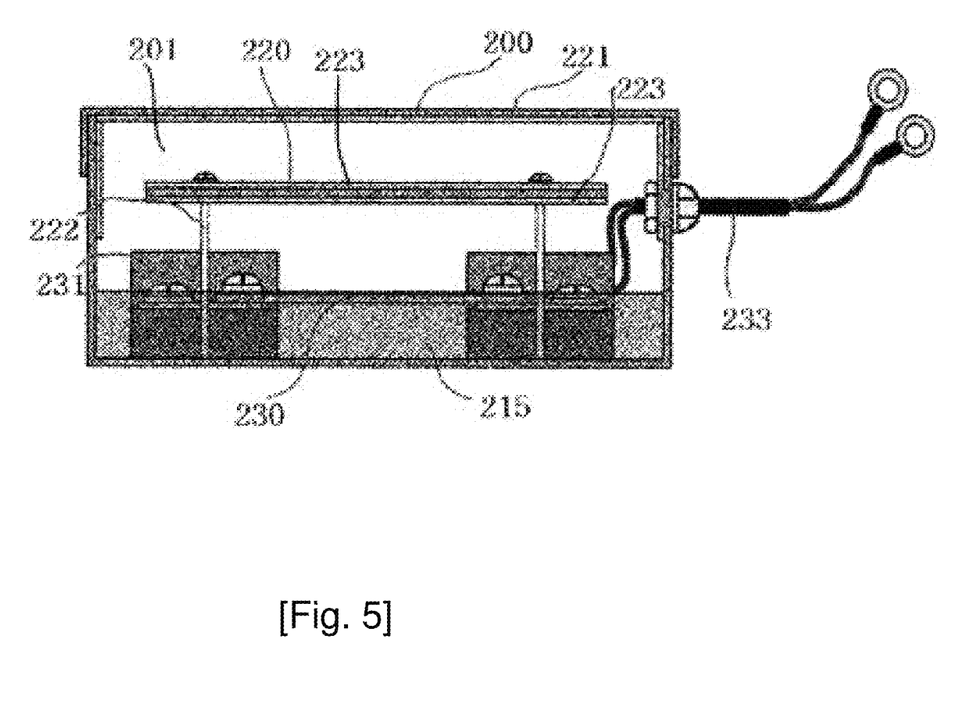
FIG. 5 is a cross-sectional view of a device according to the present invention.

FIG. 5 is a cross-sectional view of main parts of the present invention, and comprises, as recited in claim 1, a sealed housing (200) made of a plastic or metal material;

a conductive plate (230) made of a copper material, positioned in the center of the inside of the housing (200), and respectively connected to power lines so as to accumulate magnetic energy generated in an internal polymer-clay nanocomposite;

a base insulation plate (231) having insulation property and fixing the conductive plate (230);

electric wires (33) which are power lines for transmitting the magnetic energy stored on the conductive plate (230) to the outside of the housing (200);

the polymer-clay nanocomposite (215) filling the bottom portion of the housing (200) such that the conductive plate (230) is submerged therein;

an upper ceramic layer (221) coated on the inner wall of the housing (200) so as to promote the electro-magnetic interaction of a ceramic compound in the space portion above the polymer-clay nanocomposite;

an inner cover plate (220) placed in the space above the conductive plate (230) and having upper and lower surfaces coated with inner ceramic layers (223) so as to continuously radiate far-infrared rays in association with the upper ceramic layer (221) to promote magnetic interaction; and a spacer rod (222) for supporting the inner cover plate (220) in a space portion at a predetermined height.

The present invention may omit the installation of the inner cover plate, as recited in claim 2. In this case, the total surface of the ceramic coating layer on the inner wall of the housing shall account for at least 20% of the surface of the polymer-clay nanocomposite.

The polymer-clay nanocomposite (215) has the main components with chemical compositions of $SiO_2$ at 60-70 wt %, $Al_2O_3$ at 15-20 wt %, $Fe_2O_3$ at 1-5 wt %, CaO at 1-3 wt %, $Na_2O$ at 1-5 wt %, and $K_2O$ at 0.1-1.0 wt %, and the nano-fine particle matter added with $TiO_2$ and BaO at 0.01-5 wt % as the accessory components. Add $Y_2O_3$ at 0.01-1 wt % as an additive, and then add and mix the thermosetting polymer to the rest and conduct thermal-curing.

If necessary, add more $Y_2O_3$ at 0.01-1 wt % and $Bi_2O_3$ and CuO at not more than 3 wt %, and then add and mix the thermosetting polymer to the rest and conduct thermal-curing.

Preferably, the conductive plate (230) is longer than the half of the housing (200) length.

In an example, electric wires (33) in the present invention may be connected to a power busbar in a manner that each of the electric wires is connected in parallel to one of phase lines depending on the type of the power busbar.

If the power bus is of a single-phase two-wire system, each of the electric wires (33) in the present invention is connected in parallel to one of the two wires as a single device, provided as an integral unit.

If the power bus operates is of a three-phase three-wire system, each of the electric wires (33) in the present invention is connected in parallel to one of the three wires as a single power-saving device, provided as an integral unit.

If the power bus is of a three-phase four-wire system, each of the electric wires (33) in the present invention is connected in parallel to one of the three phase lines and to a neutral wire as a single power-saving device, provided as an integral unit.

Figure 10:
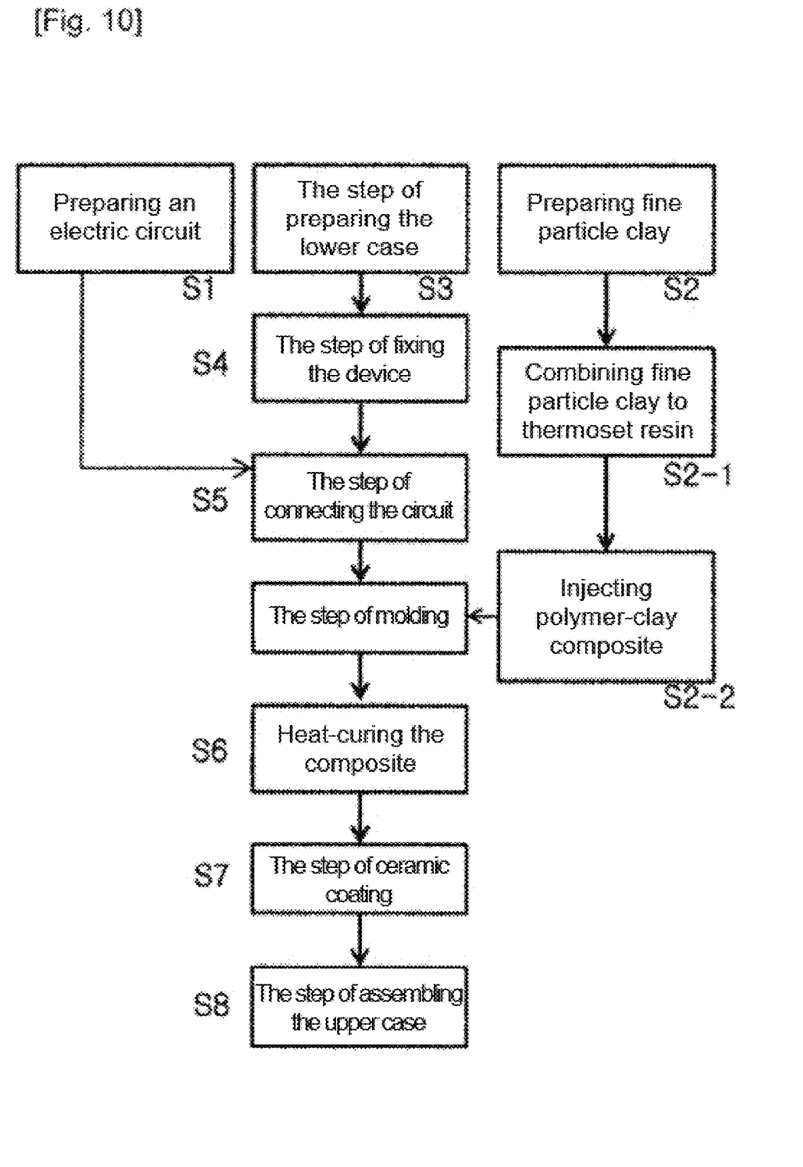
FIG. 10 is a flowchart for illustrating the manufacturing process of the device according to the present invention.

The manufacturing method of the present invention, as illustrated in FIG. 10, comprises a step of preparing an electric line (S1);

a step of preparing nano-fine particles by each composition (S2);

a step of preparing the lower case of the housing (S3);

a step of fastening the base insulation plate, the spacer rod and the conductive plate to the lower case with nails or bonding (S4);

a step of connecting the electric wire connected to the conductive plate to the electric line at the outside of the housing (S5);

a step of preparing dried-clay nano-fine particle according to the mixture ratio table and synthesizing the mixed nano-fine particle with liquid thermosetting polymer resin and performing gelation (S2-1);

a step of injecting and molding the gelated polymer-clay nanocomposite into the lower case so as to submerge the conductive plate (S2-2);

a step of thermal-curing the injected polymer-clay nanocomposite (S6);

a step of ceramic-coating where the inner cover plate is joined to the lower case, and the lower and upper surfaces of the lower case and inner cover plate and the upper case are ceramic-coated to be hardened (S7); and a step of assembling them after the ceramic coating so as to form the housing (S8).

As will be appreciated, the present invention may omit the installation of the inner cover plate. In this case, the step of preparing and coating the inner cover plate at S7 is omitted, and the total surface of the ceramic coating layer shall account for at least 20% of the surface of the polymer-clay nanocomposite.

The operation principle of the present invention will be described hereinafter.

Application of the upper ceramic layer (221) of far-infrared radiation and the inner ceramic layer (223)

In the present invention, the inner ceramic layers (223) are formed on the upper and lower surfaces of the cover plate (220), and the upper ceramic layers (221) are formed on the inner walls of the upper and lower cases of the housing, as recited in claim 1 (it will be understood that this description is based on the complete product).

This inner ceramic layers (223) and upper ceramic layers (221) may be formed of any metallic oxide ($Al_2O_3$, $SiO_2$, $TiO_2$, $ZrO_2$ or other oxides of transition elements) or metallic carbide (Sic Wc). If these substances are made as heating elements and heated or applied with electric currents, heat is generated due to the great electric resistance. Here, with the heat are generated radiant rays with various wavelengths as well as far-infrared rays. As is known until now, far-infrared rays are radiated due to the vibration from metal-oxygen combination, the more oxygen combined in the compound (for example, $V_2O_5$) the more far-infrared rays are generated. Therefore, every oxide can be used as material for far-infrared radiation. Considering from this point of view about material for generating far-infrared rays, every matter emits heat and certain amount of light when heated. Light or heat generation is different depending on the atomic structure and combination status of the matter used as a heating element, using specific matter is required.

Considering these points, the present invention allows that the far-infrared radiation ceramic layer on the inner wall of the housing (200) can be added or mixed aside from the main material with matters to reinforce generation of far-infrared rays and anions including tourmaline, titanium, loess, nephrite, or zirconia. The range of efficient wavelengths is 8-11 nm.

Here, the present invention may omit the installation of the inner cover plate as recited in claim 2. In this case, the volume of the upper ceramic layer replaced with the inner ceramic layer of the inner cover plate shall account for at least 20% of the volume of the polymer-clay nanocomposite.

Interaction Between Far-Infrared Rays and the Polymer-Clay Nanocomposite (215)

Clay solids such as the polymer-clay nanocomposite (215) have specific vibration frequencies depending on the shape, treating method, tension, elasticity and density, and clay liquids have specific vibration frequencies depending on the shape of the surrounding solid, treating method, tension, elasticity and density. This vibration frequency is called natural vibration frequency or natural frequency. That is, various molecular structures composing each matter have unique frequency of vibration and rotation depending on different gathering methods of the mass structure, arrangement, and gathering force of the atoms. If the radiation energy when radiating far-infrared rays to matters and the vibration frequency of the matter are identical, the molecules absorb far-infrared radiation energy so that the vibration becomes more intense, which is called resonance absorption effect.

Described in more detail, the upper ceramic layer (221) on the inner wall of the housing (200) and the inner ceramic layers (223) on the inner cover plate (220) of the present invention vibrate in resonance at the frequency of 8-11 um. Here, in the present invention, the polymer-clay nanocomposite (215) is added, and when the polymer-clay nanocomposite (215) contacts with the far-infrared rays radiated from the ceramic layers (221, 223) and vibrating in resonance, the energy becomes activation energy gradually increasing in a form of electromagnetic wave, and the energy (further described below) inductively transmitted to the conductive plate submerged in the polymer-clay nanocomposite (215).

Application of the Alternating Magnetic Field (Generation of Spin Energy)

Flowing currents generate magnetic fields according to Flemming's right-handed screw rule, and the form of magnetic fields is decided by the flowing direction of currents. That is, mains electricity AC power supplies alternate (polarity periodically changes between positive (+) and negative (−)), thus generating alternating magnetic field. When the device according to the present invention is installed, the electricity supplied to the installation space, that is, the alternating magnetic field generated by the alternating current flow enters into the housing (200) via electric wires (33), and this magnetic field and electrons within the polymer-clay nanocomposite (215) magnetically interact. The magnetic interaction refers to the forces of attraction and repulsion generated between alternating energy (the energy of which polarity periodically changes between positive (+) and negative (−)). As electrons have negative (−) energy, attractive force is generated when the electrons contact with positive (+) energy, and repulsive force is generated when contacting with negative (−) energy. If the polymer-clay nanocomposite (215) inside the housing (200) was a conductive matter in which electrons can move with ease, currents would have been generated. However, the polymer-clay nanocomposite (215) has strong insulation property, causing the atomic vibration rather than electronic movement (physical atomic lattice vibration). This results in the energy generation due to lattice vibration caused by magnetic interaction (transmission of magnetic energy), more specifically, transmission of electron spins (each momentum contained in electrons) between the adjacent electrons. In short, magnetic waves (spin energy) generated by regular electron spin transmission are supplied to the power line connected to the conductive plate (230) inside the housing (200) of the present invention.

Inside an atom isolated from other physical influences, electronic energy is decided solely depending on principal quantum number (n). However, other quantum numbers also affect the energy under other physical influences. Spin energy refers to the energy generation between the spin and outer magnetic field during the operation of factors affecting the energy aside from principal quantum number. Spins form the magnetic dipole moment, which interacts with the magnetic field, generating potential energy. As a result, electrons with the same principal quantum number, azimuthal quantum number, and magnetic quantum number have different energy.

Supply of Magnetic Waves (Function of the Spin Energy)

The magnetic waves supplied from the housing (200) to the power line also alternates between positive (+) and negative (−), because lattice vibration generating magnetic waves is caused by alternating magnetic field generated in the installation space. Here, the ultimate difference between alternating magnetic fields generated by mains electricity AC power supplies and magnetic waves generating from the inside of the housing (200) of the present invention is that the magnetic waves can affect electron spin change of internal atoms of the power line because the magnetic waves enable direct transmission between atoms by transmitting electron spins of atoms of a substance. Therefore, electron spins of the electrons (atoms) of the power line regularly change according to the change of supplied magnetic waves. Under ordinary conditions of current generation, electronic movement is disturbed by the random directional nature due to lattice vibration and irregular state of electron spins. However, the regular state of the electron spins caused by the magnetic waves is disturbed less than the aforementioned ordinary conditions of current generation, thus increasing the efficiency of the currents.

Polymer-Clay Nanocomposite (Technical Classification of Special Magnetic Matter)

Figure 9:
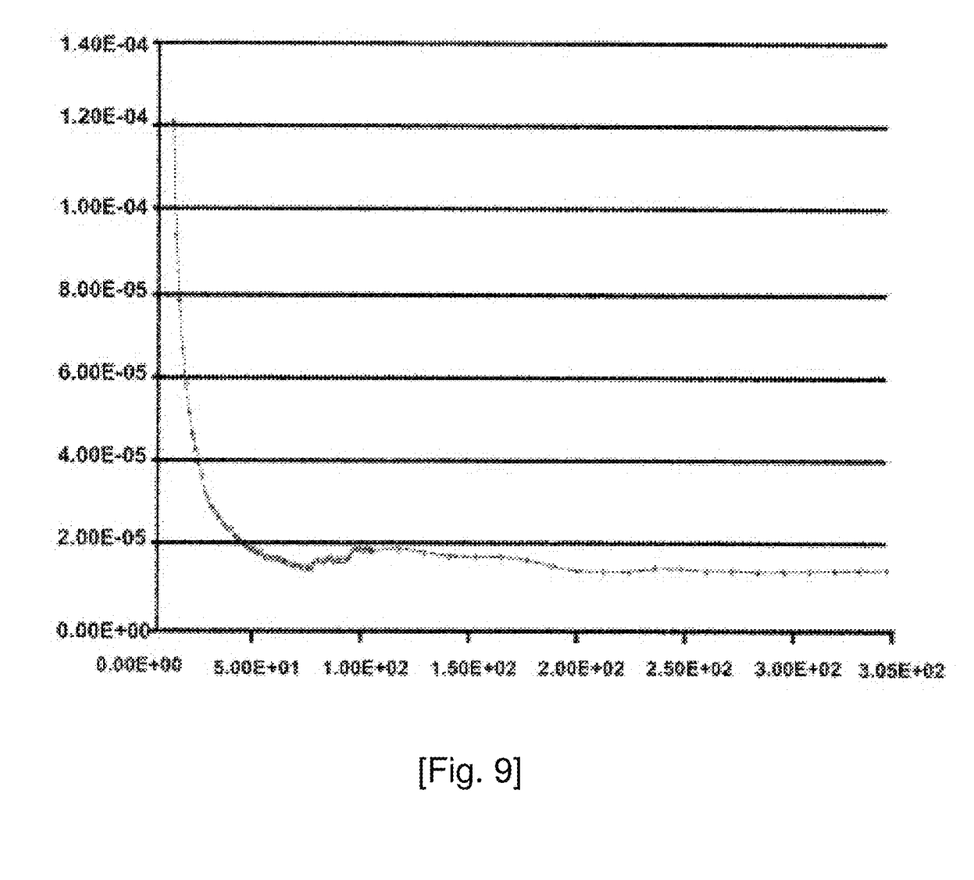
FIG. 9 is a graph showing magnetic force characteristic of the polymer-clay nanocomposite employed in the present invention measured by a SQUID.

The nanocomposite of the device in the present invention can be classified as a polymer-clay nanocomposite produced by the sol-gel method. Entirely novel clay composition and thermosetting polymer resin is applied to give special magnetic characteristics for the operation of the device. The polymer-clay nanocomposite produced by this method have dielectric property improved several times compared to generic dielectric material depending on the temperature and time when mixing the master batch and conditions of post-cure of composite material. In addition, the nanocomposite has magnetic characteristics as shown in FIG. 9 due to the additives, retaining proper properties for magnetic interaction for the operation of the device.

The related academic background is as follows, and is only provided to describe the present invention, not to limit the scope of the present invention.

The polymer-clay nanocomposite of the present invention is produced with small amount of clay but exhibits significant mechanical property improvement, and the production of the nanocomposite can be summarized as dispersing clay with a bed structure to a polymer matrix. The polymer-clay nanocomposite is a system where the technology of adjusting hydrophilic clay surface, knowledge regarding mineral materials employing the physical properties of clay, polymer combination, polymer rheology, polymer solution behavior, and mechanical properties are complexly applied. The nanocomposite refers to a matter composed with structures or substances of not less than 2 types, and of which the phase size is at the nanometer scale ($10^{-9}$ m). The additional filler is used for the nanocomposites to improve mechanical properties including modulus or tensile strength. In particular, the present invention enables the improvement of mechanical properties in inverse correlation (for example, modulus and toughness improvement) along with flame retardancy and barrier property. This property improvement is enabled by the addition of bentonite clay mineral and nanoparticle matters, which is construed as the layered structured clay losing regularity between layers inside the polymer matrix (thermosetting resin) and becoming exfoliated structure in which the clay is dispersed to individual layers, radically improving the properties. This phenomenon includes the process of polymer inserted at the narrow gap between the layers of clay, and the inserted polymer irreversibly widening the gap and allowing the layer structure of the clay to be lost. Before or after assembling the device for optimizing electrical energy, the radiation ceramic coating layer is heated (preferably in the range of 100-150° C.; since at the temperature over 150° C. the case might be deformed, while at the temperature below 100° C. the ceramic layer activation is slow that forming the far-infrared rays at the desired energy band is difficult) before shipped to the market (it is desirable to flash-heat within the range where the case composing the housing is not deformed.) Then far-infrared rays are generated due to the heating from the far-infrared radiation ceramic coating layer at the inside in countless wavelength forms, causing resonance absorption effect on the polymer-clay nanocomposite.

The device for optimizing electrical energy according to the present invention can be applied to the facilities which have electricity consumption of 0.1 KVA-1500 KVA depending on the size and gap of the conductive plate (230) and the material and size of the polymer-clay nanocomposite (215), while the device for the consumption of 0.1 KVA-0.5 KVA is classified as modular use, the device for 1 KVA-30 KVA as domestic use, the device for 50 KVA-200 KVA as commercial use, and the device for 300 KVA-1500 KVA as industrial use.

Embodiment 1

When preparing the clay nano-fine particle, harvest each raw material clay; conduct drying and calcination; inject into a dry nano grinding mill so that the clay is grinded to the extent where the particle size becomes at 50-100 nm; grind again the particles larger than 100 nm so that the overall particle size could be no more than 100 nm mesh (S1).

Mix the prepared nano-fine particle composition in the following Table 1 with thermosetting polymer resin in a mixer (S2-1).

When injecting and molding the mixed polymer-clay nano matter into the lower case of the housing according to the injection dose table, inject the mixed polymer-clay nano matter with an injector into the prepared lower case according to the injection dose table (S2-2).

After the injection is completed, harden in a hardening chamber at 60° C. to 80° C. (S6).

Then install the inner cover plate (220) inside the housing (200); coat the upper ceramic layer (221) on the walls of the lower and upper case composing the housing and coat the ceramic layer (223) on the inner cover plate (220); harden for 5 minutes at 100 to 150° C., preferably at 110° C.; fasten the lower and upper cases and conduct inspection.

If the composition of the polymer-clay nanocomposite of the present invention is as the following Table 1, the test result before and after connecting to a domestic power supply is as described in FIGS. 6 to 9.

TABLE 1

| Substance | Weight ratio (wt %) | Note |
|---|---|---|
| Main components | | |
| $SiO_2$ | 64.19 | Bentonite clay mineral |
| $Al_2O_3$ | 16.1 | |
| $Fe_2O_3$ | 3.68 | |
| CaO | 2.92 | |
| $Na_2O$ | 2.6 | |
| $K_2O$ | 0.87 | |
| Accessory components | | |
| $TiO_2$ | 3.42 | Specific inductive capacity improved |
| BaO | 3.01 | Specific inductive capacity improved |
| Optional additives | | |
| $Y_2O_3$ | 0.27 | Magnetism improved |
| $Bi_2O_3$ | 1.95 | Low-temperature sintering improved |
| CuO | 0.99 | Dielectric loss improved |

Figure 6:
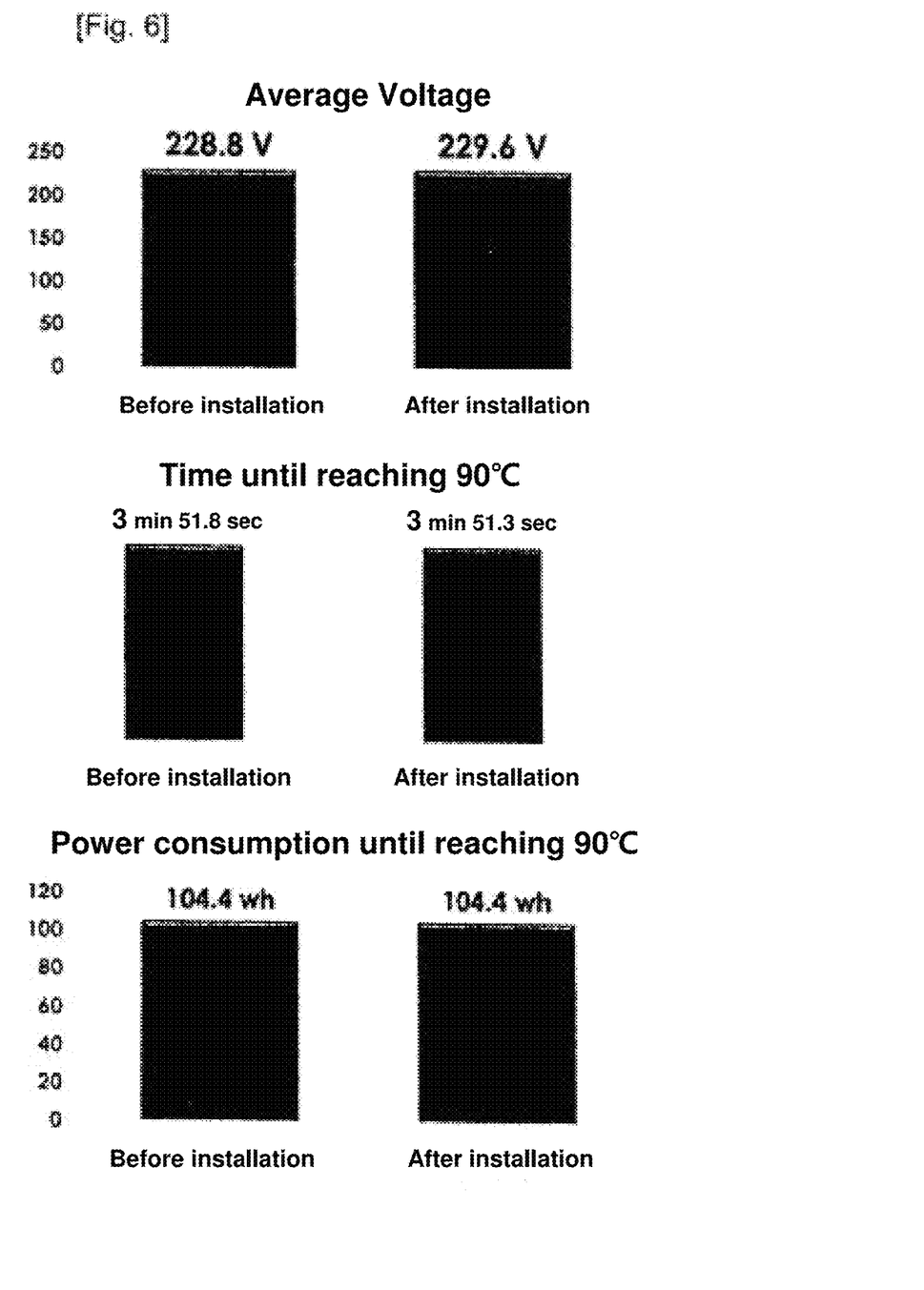
FIG. 6 is a diagram showing the average voltage before and after installation, the time until reaching 90° C., and power consumption until reaching 90° C.
Figure 7:
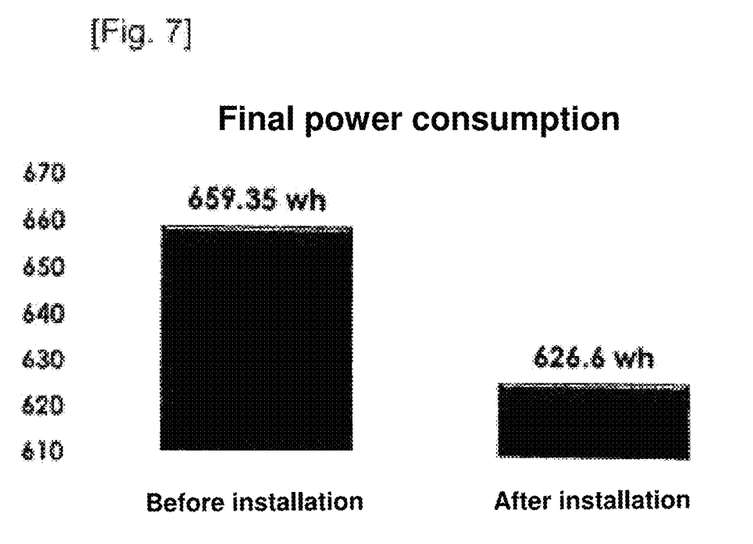
FIG. 7 is a diagram showing final power consumption.
Figure 8:
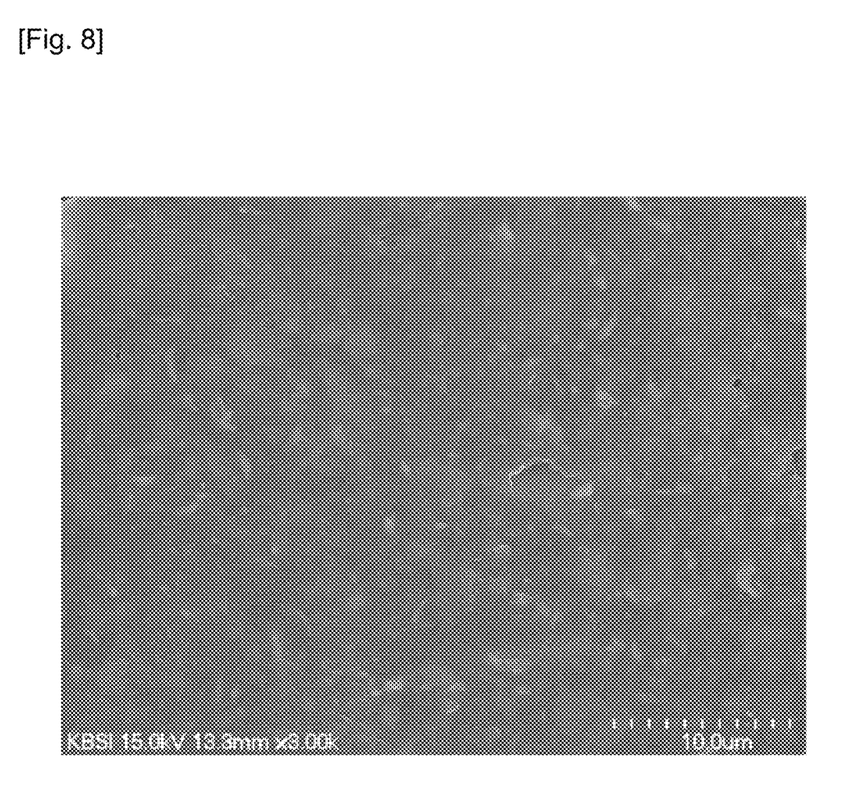
FIG. 8 is an enlarged photograph of the polymer-clay nanocomposite employed in the present invention.

FIG. 6 is a diagram showing the average voltage before and after installation, the time until reaching 90° C., and power consumption until reaching 90° C.; FIG. 7 is a diagram showing final power consumption; FIG. 8 is an enlarged photograph of the surface of the polymer-clay nanocomposite (taken by a FE-SEM) employed in the present invention; and FIG. 9 is a graph showing magnetic force characteristics of the polymer-clay nanocomposite employed in the present invention measured by a SQUID.

Test Example 1

In Test Example 1, the device for optimizing electrical energy described in Embodiment 1 of the present invention is applied to an induction heating oven. With a container filled with 1000 ml of water as a load, power consumption during 30 minutes was measured 3 times before installation and 3 times after installation to compare the average of the former and that of the latter. In addition to the average power consumption, in order to measure whether the efficiency decreases due to lower power consumption, the time and power consumption from the operation of the induction heating oven until the temperature reaches 90° C. were also measured to increase the objectivity of the test. This test was performed by TUV Austria, and the test result is summarized in Table 2 below:

TABLE 2

| Institution (TUV Austria) | Before installing | After installing |
|---|---|---|
| Average voltage during the test | 228.8 V | 229.6 V |
| Time until reaching to 90° C. | 3 min 51.8 sec | 3 min |
| Power consumption until reaching to 90° C. | 104.4 Wh | 104.4 Wh |

TABLE 2-continued

| Institution (TUV Austria) | Before installing | After installing |
|---|---|---|
| Final power consumption after operating for 30 min | 659.35 Wh | 626.60 Wh |

INDUSTRIAL APPLICABILITY

According to exemplary embodiments of the present invention, for commercial, domestic, and industrial electric lines, the energy passed through far-infrared rays can be employed as the means for generating magnetically-activated electromagnetic wave energy so as to supply it to the conductive plate, thereby improving the efficiency of transmitting electrical energy.

The invention claimed is:

1. A device for optimizing electrical energy comprising:
a sealed housing (200) with upper and lower cases made of a plastic or metal material;
a conductive plate (230) made of a copper material, the plate being positioned in the center of the inside of the housing (200), and respectively connected to power lines so as to accumulate magnetic energy generated in an internal polymer-clay nanocomposite;
a base insulation plate (231) having insulation property and fixing the conductive plate;
electric wires (33) which are power lines for transmitting the magnetic energy stored on the conductive plate to the outside of the housing;
the polymer-clay nanocomposite (215) filling the bottom portion of the inside of the housing such that the conductive plate is submerged therein;
an upper ceramic layer (221) coated on the inner wall of the housing (200) so as to promote the electro-magnetic interaction of a ceramic compound in the space portion above the polymer-clay nanocomposite;
an inner cover plate (220) placed in the space above the conductive plate and having upper and lower surfaces coated with inner ceramic layers (223) so as to continuously radiate far-infrared rays in association with the upper ceramic layer (221) to promote magnetic interaction; and
a spacer rod (222) for supporting the inner cover plate (220) in a space portion at a predetermined height;
wherein the polymer-clay nanocomposite (215) has the main components with chemical compositions of $SiO_2$ at 60-70 wt %, $Al_2O_3$ at 15-20 wt %, $Fe_2O_3$ at 1-5 wt %, CaO at 1-3 wt %, $Na_2O$ at 1-5 wt %, and $K_2O$ at 0.1-1.0 wt %, added with $TiO_2$ and BaO at 0.01-5 wt % as the accessory components, $Y_2O_3$ at 0.01-1 wt % added as an additive, and then the thermosetting polymer is added to and mixed with the rest and thermal-cured.

2. The device according to claim 1, wherein $Bi_2O_3$ and CuO are added as additives at no more than 3 wt %, and then the thermosetting polymer is added to and mixed with the rest and thermal-cured.

3. The device according to claim 1, wherein the conductive plate (230) is formed to be longer than the half of the length of the housing (200).

4. The device according to claim 1, wherein each of the electric wires is connected in parallel to one of phase lines of a power busbar depending on the type of the power busbar.

5. The device according to claim 4, wherein, if the power busbar is of a single-phase two-wire system, each of the electric wires is connected in parallel to one of the two wires as a single device, provided as an integral unit.

6. The device according to claim 4, wherein, if the power busbar is of a three-phase three-wire system, each of the electric wires is connected in parallel to one of the three wires as a single power-saving device, provided as an integral unit.

7. The device according to claim 4, wherein, if the power busbar is of a three-phase four-wire system, each of the electric wires is connected in parallel to one of the three phase lines and to a neutral wire as a single power-saving device, provided as an integral unit.

8. A device for optimizing electrical energy comprising:
a sealed housing (200) made of a plastic or metal material;
a conductive plate (230) made of a copper material, the plate being positioned in the center of the inside of the housing (200), and respectively connected to power lines so as to accumulate magnetic energy generated in an internal polymer-clay nanocomposite;
a base insulation plate (231) having insulation property and fixing the conductive plate;
electric wires (33) which are power lines for transmitting the magnetic energy stored on the conductive plate to the outside of the housing;
the polymer-clay nanocomposite (215) filling in the bottom portion of the housing such that the conductive plate is submerged therein; and
an upper ceramic layer (221) coated on the inner wall of the housing (200) so as to promote the electro-magnetic interaction of a ceramic compound in the space portion above the polymer-clay nanocomposite;
wherein the polymer-clay nanocomposite (215) has the main components with chemical compositions of $SiO_2$ at 60-70 wt %, $Al_2O_3$ at 15-20 wt %, $Fe_2O_3$ at 1-5 wt %, CaO at 1-3 wt %, $Na_2O$ at 1-5 wt %, and $K_2O$ at 0.1-1.0 wt %, added with $TiO_2$ and BaO at 0.01-5 wt % as the accessory components, $Y_2O_3$ at 0.01-1 wt % added as an additive, and then the thermosetting polymer is added to and mixed with the rest and thermal-cured.

9. The device according to claim 8, wherein the total surface of the ceramic coating layer coated on the inner wall of the sealed housing accounts for at least 20% of the surface of the polymer-clay nanocomposite.

10. The device according to claim 8, wherein $Bi_2O_3$ and CuO are added as additives at no more than 3 wt %, and then the thermosetting polymer is added to and mixed with the rest and thermal-cured.

11. The device according to claim 8, wherein the conductive plate (230) is formed to be longer than the half of the length of the housing (200).

12. The device according to claim 8, wherein each of the electric wires is connected in parallel to one of phase lines of a power busbar depending on the type of the power busbar.

* * * * *